US005775108A

United States Patent [19]
Ansart et al.

[11] Patent Number: 5,775,108
[45] Date of Patent: Jul. 7, 1998

[54] COMBUSTION CHAMBER HAVING A MULTI-HOLE COOLING SYSTEM WITH VARIABLY ORIENTED HOLES

[75] Inventors: Denis Roger Henri Ansart, Bois le Roi; Patrick Samuel André Ciccia, Paris; Michel André Albert Desaulty, Vert St Denis, all of France

[73] Assignee: Societe Nationale d'Etude et de Construction de Moteurs d'Aviation "Snecma", Paris, France

[21] Appl. No.: 633,314

[22] Filed: Apr. 17, 1996

[30] Foreign Application Priority Data

Apr. 26, 1995 [FR] France .................................... 95 04968

[51] Int. Cl.[6] ................................ F23R 3/00; F02K 1/82

[52] U.S. Cl. ................................ 60/752; 60/757; 60/755

[58] Field of Search ............................ 60/265, 750, 752, 60/755, 756, 757, 758

[56] References Cited

U.S. PATENT DOCUMENTS

| | | | |
|---|---|---|---|
| 3,656,297 | 4/1972 | Monk | 60/755 |
| 3,916,619 | 11/1975 | Masai et al. | 60/756 |
| 4,790,140 | 12/1988 | Sato et al. | 60/757 |
| 5,000,005 | 3/1991 | Kwan et al. | 60/757 |
| 5,307,637 | 5/1994 | Stickles et al. . | |
| 5,323,602 | 6/1994 | Defever | 60/755 |
| 5,329,773 | 7/1994 | Myers et al. | 60/757 |
| 5,501,071 | 3/1996 | Ansart et al. . | |

FOREIGN PATENT DOCUMENTS

| | | | |
|---|---|---|---|
| 994115 | 2/1972 | Canada | 60/756 |
| 0 486 133 | 5/1992 | European Pat. Off. . | |
| 0 492 864 | 7/1992 | European Pat. Off. . | |
| 0 512 670 | 12/1992 | European Pat. Off. . | |
| 0 592 161 | 4/1994 | European Pat. Off. . | |
| 512723 | 1/1921 | France | 60/758 |
| 2 410 138 | 6/1979 | France . | |
| 2 635 577 | 2/1990 | France . | |
| 2607214 | 1/1977 | Germany | 60/758 |
| 37117515 | 4/1982 | Germany | 60/757 |
| 2023232 | 12/1979 | United Kingdom | 60/755 |

OTHER PUBLICATIONS

Jürgen Köhler, et al., "Calculation of the Disturbance to Combustion Chamber Film Cooling due to Air injection through a Row of Jets", Zeitschrift Für Flugwissenschaften Und Weltraumforschung, vol. 9, No. 1, Feb. 1985, (pp. 34–42).

S. J. Stevens, et al., "Experimental Studies of Combustor Dilution Zone Aerodynamics, Part I: Mean Flowfields", Journal of Propulsion and Power, vol.6, No. 3, May 1, 1990, (pp. 297–304).

*Primary Examiner*—Timothy Thorpe
*Assistant Examiner*—Ted Kim
*Attorney, Agent, or Firm*—Oblon, Spivak, McClelland, Maier & Neustadt, P.C.

[57] ABSTRACT

A combustion chamber, particularly for a turbomachine, has at least one generally axially extending wall provided with a plurality of through holes defining a multi-hole cooling system for the wall. The wall also has a plurality of dilution holes which affect locally the flow of burnt gases in the chamber, and the cooling through holes are oriented according to the local flow of burnt gases in the chamber. In particular the wall is subdivided into first zones, downstream of the dilution holes, in which the through holes are oriented substantially in countercurrent to the overall flow direction of the burnt gases in the chamber, second zones and third zones which are disposed on opposite sides of the first zones and in which the orientation of the through holes is inclined both axially and circumferentially, and a fourth zone covering the remainder of the wall and in which the through holes are inclined axially in the overall flow direction of the burnt gases.

7 Claims, 3 Drawing Sheets

COMBUSTION CHAMBER HAVING A MULTI-HOLE COOLING SYSTEM WITH VARIABLY ORIENTED HOLES

BACKGROUND OF THE INVENTION

1. Field of the Invention

This invention relates to a combustion chamber, particularly for a turbomachine, of the kind comprising at least one wall extending in a generally axial direction, The wall being provided with a plurality of through holes constituting a multi-hole system for the passage of a fluid for cooling the wall, and a plurality of dilution holes evenly distributed in a transverse plane relative to the general direction of the flow of the burnt gases from combustion in said combustion chamber, each through hole of said multi-hole system having a geometric axis extending in a direction defined by an inclination angle A between said geometric axis and the normal to said wall at said through hole, and by a clock angle B between the plane containing said geometric axis and said normal and the plane defined by said normal and said general direction of flow of burnt gases in said combustion chamber.

2. Summary of the Prior Art

Multi-hole cooling of combustion chamber walls is known, the holes usually being disposed equidistant from eachother in a staggered network.

The holes are supplied with cooling air delivered by the compressor, and heat exchange takes place by forced convection in the holes and by conduction in the wall itself. The cool air feed to the holes produces on the inner face of the wall, downstream of the flow, a protective film between the wall and the burnt gases created by combustion in the chamber. To limit impairment of the effectiveness of the cooling film the holes are arranged so that the cooling air is prevented from mixing prematurely with the burnt gases. For this purpose, the holes are each inclined at an angle A to a normal to the inner wall such that the cooling air licks the wall to be cooled. EP-A-0 486 133 discloses a wall of this type wherein the holes are inclined in axial planes. EP-A-0 492 864 discloses a combustion chamber wall in which the holes are also inclined in a circumferential direction at a clock angle B which corresponds to the angle of the swirl of the combustion gases along the inside surface of the wall. EP-A-0 592 161 discloses, with reference to FIG. 6, a multi-hole annular combustion chamber wall wherein the holes are oriented in directions defined by an axial inclination angle A and a circumferential clock angle B such that the flow of cool air fed into the chamber creates a ring of protective air which swirls around the flow of the burnt gases.

In all of these known arrangements the inclination angles A and the clock angles B defining the direction of the axes of the cooling holes relatively to the general flow direction of the burnt gases are respectively equal to predetermined values.

However, 3D calculations show that the burnt gas flow in the combustion chamber is not always longitudinal, but in some zones is slightly inclined and even opposed to the general or overall flow direction, particularly downstream of the dilution holes, and detachment of the cooling air film from the wall may occur in these zones.

SUMMARY OF THE INVENTION

It is an object of the invention to prevent the air delivered by the multi-hole cooling system in a combustion chamber of the kind described from detaching prematurely from the chamber wall, and to this end the invention proposes to orientate the cooling holes in dependence upon the local flow direction of the burnt gases in the vicinity of the holes.

More specifically, according to the invention, there is provided a combustion chamber of the kind described wherein said wall is subdivided into a plurality of zones in which the flow of said burnt gases differs locally, and the geometric axes of said through holes in each of said zones all extend in a common direction which is determined according to the flow of burnt gases locally in the respective zone.

Preferably, said wall is subdivided into first zones which are disposed downstream of said dilution holes, second and third zones disposed on opposite sides of each of said first zones relative to an axial plane passing through the respective dilution hole, and a fourth zone covering the remainder of said wall, the geometric axes of said through holes in said first zones extending substantially in countercurrent to said general direction of flow of burnt gases in said combustion chamber.

Preferably the geometric axes of the through holes in the fourth zone have an axial inclination angle A greater than 30°, and their clock angle B is substantially 0°. The cooling air from these holes licks the inside surface of the wall in the overall axial direction of the burnt gas flow.

The through holes in the first zones—i.e., downstream of the dilution holes—diffuse cooling air in countercurrent to the overall flow direction of the burnt gases. Their inclination angle A is preferably between 0° and −60° and their clock angle B is substantially 0°.

The second and third zones are located on opposite sides of each of the first zones in the circumferential direction, and the through holes in these two zones are oriented to direct cooling air towards the axial plane passing through the corresponding dilution hole and in the direction of the general flow of the burnt gases.

Other preferred features and advantages of the invention will become apparent from the following description of a preferred embodiment, given by way of example only, and with reference to the accompanying diagrammatic drawings.

DESCRIPTION OF THE PREFERRED EMBODIMENT

Figure 1:
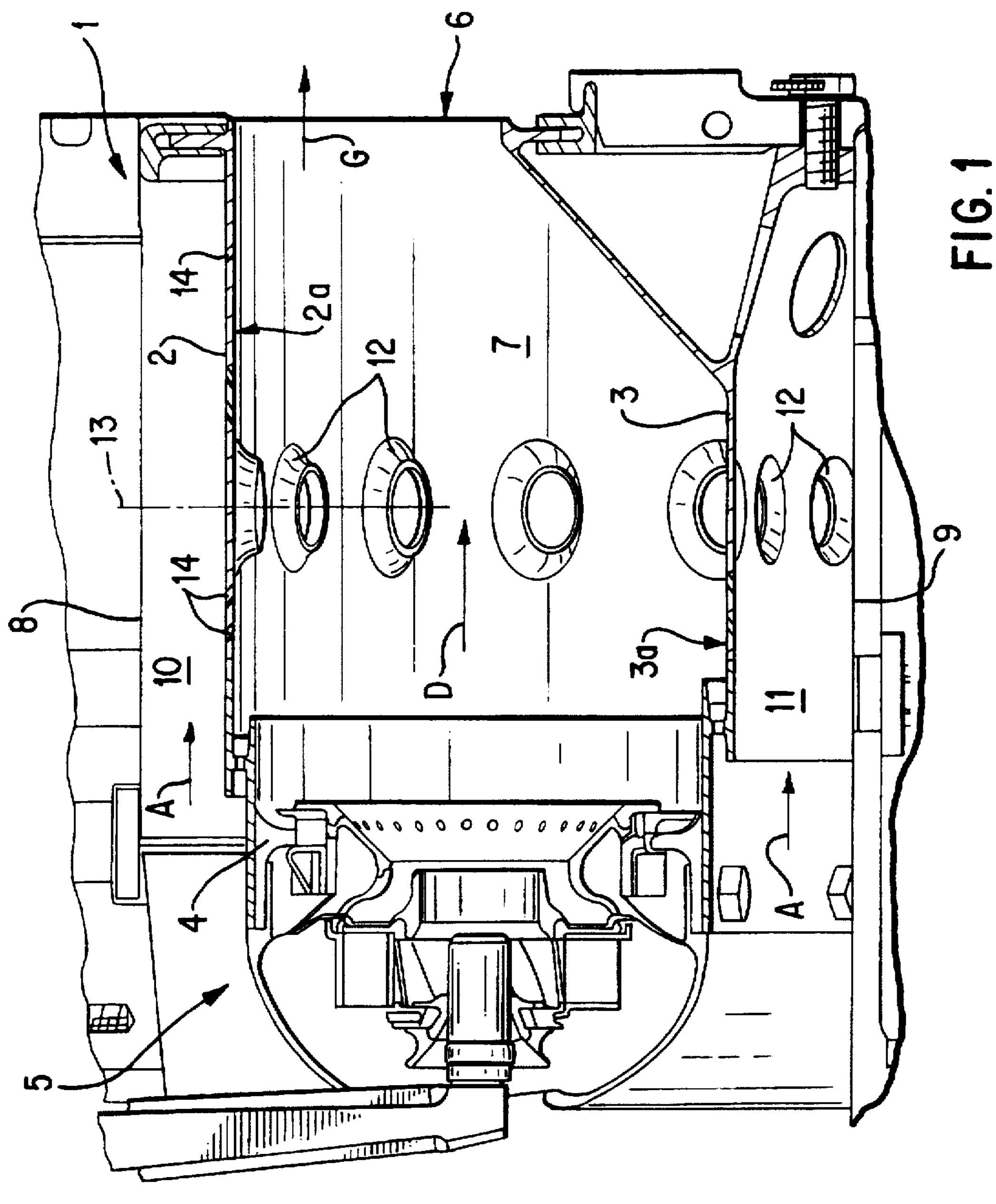
FIG. 1 is a radial section through an embodiment of an annular combustion chamber in accordance with the invention for a turbomachine.

The annular combustion chamber 1 shown in FIG. 1 comprises an outer annular axial wall 2 and an inner annular axial wall 3 which are joined at their upstream ends by a chamber end wall 4 fitted with injection systems 5, and which define between their downstream ends an annular aperture 6 for the escape of the burnt gases G towards a turbine (not shown). The burnt gases G flow in the interior 7 of the combustion chamber 1 in a generally axial direction represented by the arrow D.

The outer and inner walls 2 and 3, together with an outer shell 8 and an inner shell 9 define annular passages 10, 11 for the flow of cooling air A delivered by a compressor (not shown) disposed upstream of the combustion chamber 1.

The two walls 2, 3 each have a number of dilution holes 12 evenly distributed in a plane 13 perpendicular to the turbomachine axis, and a plurality of through holes 14 forming a multi-hole cooling system. Some of the cooling air A enters the interior 7 of the chamber 1 through the dilution holes 12 and participates in the depletion and cooling of the combustion gases in the dilution zone of the combustion chamber 1, while the remainder of the air A enters the interior 7 through the cooling system holes 14 to form a cooling film on the inside surfaces 2a, 3a of the axial walls 2, 3.

Figure 2:
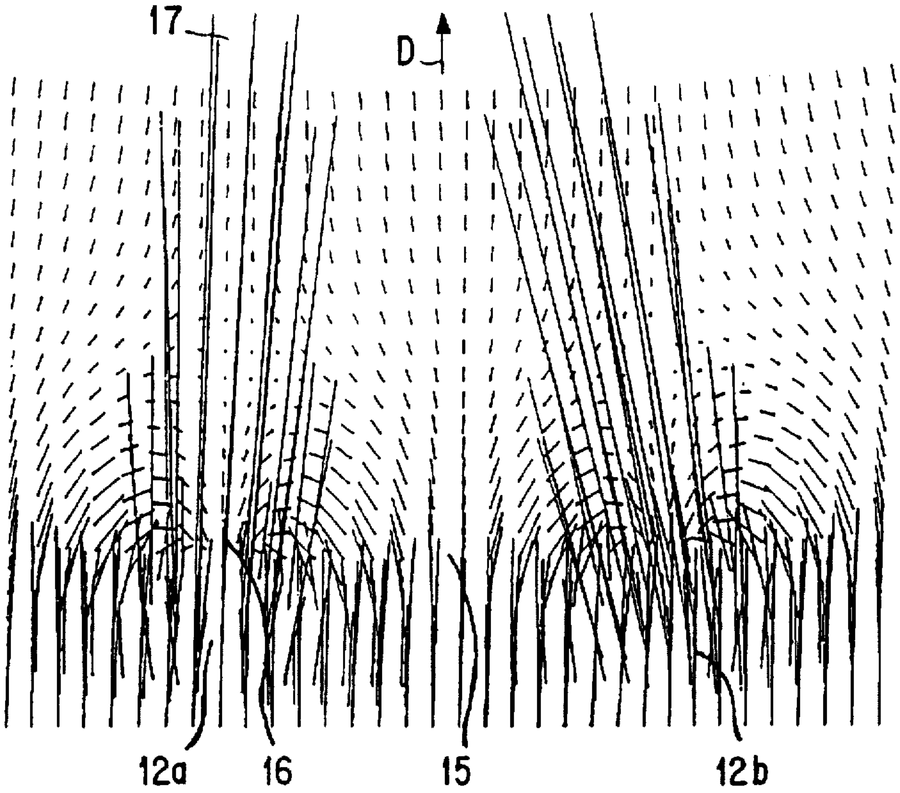
FIG. 2 is a 3D representation of the burnt gas flow near two dilution holes in the combustion chamber of FIG. 1.

FIG. 2 shows a diagram of the gas velocities near the inside surface 2a of the outer wall 2 in the region of two dilution holes 12a, 12b, the diagram having been obtained by 3D calculations.

This diagram shows that in the zone 15 separating the two dilution holes 12a, 12b the gases flow in the direction D.

However, in the zones 16 disposed immediately downstream of the dilution holes 12a, 12b the gases flow back towards these holes i.e., in a direction completely opposite to the direction D.

On either side of each zone 16 the gases flow in a direction inclined towards the axial plane 18 which extends through the corresponding dilution hole, and directed overall in the general direction of flow D of the burnt gases.

Upstream of the dilution holes 12a, 12b, and in the region remote from these holes, the burnt gases flow in the direction D.

The 3D diagram of the temperatures near the dilution holes also show notable zonal differences.

In accordance with the invention, that region of each wall 2, 3 which includes the cooling system holes 14 is subdivided into a number of zones, and in each zone the inclination angles A which the axes 30 of the holes 14 in this zone make with normals 31 to the wall are identical, as are the clock angles B which the planes 32 containing the axes 30 and the normals 31 make with the axial planes 33 containing the normals. In other words, the axes 30 of all the holes 14 in each zone are oriented in the same direction as each other, with this direction being different in different zones.

Figure 3:
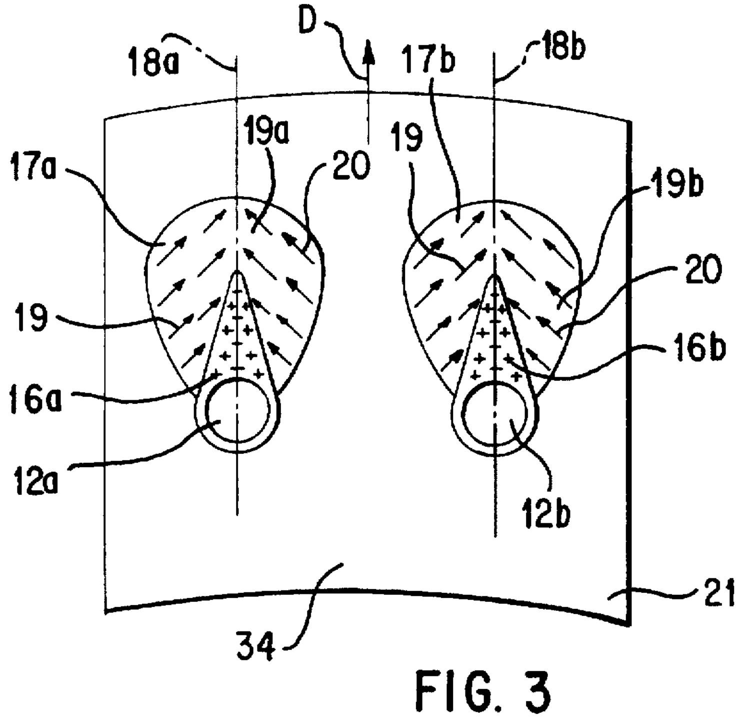
FIG. 3 shows how the multi-hole wall of the combustion chamber is subdivided into a number of homogeneous zones.

FIG. 3 shows an axial wall portion 34 including two dilution holes 12a, 12b, the arrow D representing the general flow direction of burnt gases in the combustion chamber 1. The references 16a, 16b represent first zones in which the burnt gases flow locally substantially in countercurrent to the general flow direction D. In second zones 17a, 17b on the left of the axial planes 18a, 18b through the dilution holes, the burnt gases flow locally in the overall direction of the arrows 19. In third zones 19a, 19b to the right of the axial planes 18a, 18b, the gases flow locally in the overall direction of the arrows 20. In a fourth zone 21 outside the first, second and third zones 16a, 16b, 17a, 17b, 19a, 19b, the gases flow in the overall direction of the arrow D.

Figure 4:
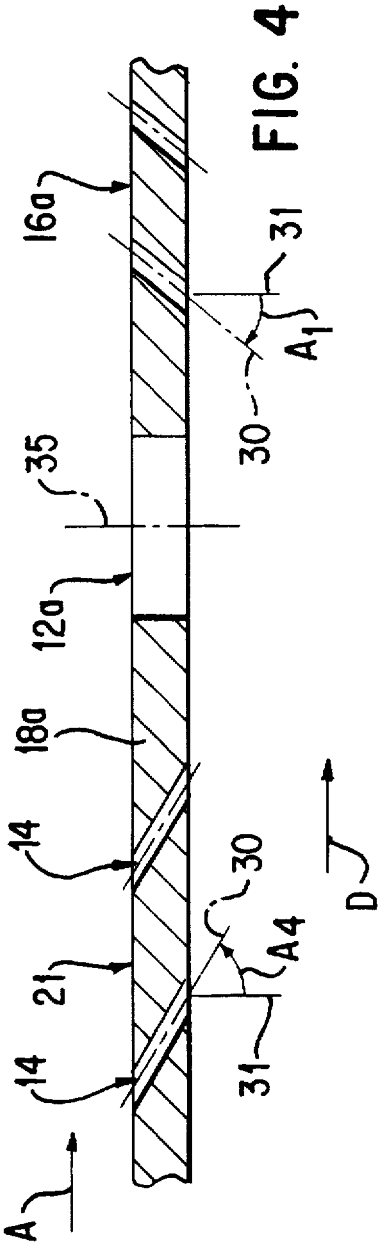
FIG. 4 is an axial section, on an enlarged scale, through part of the multi-hole wall and taken in an axial plane extending through the axis of a dilution hole.

As FIG. 4 shows, the orientation of the holes 14 in the fourth zone 21 is defined by an inclination angle $A_4$ greater than 30°, and a clock angle B of substantially 0°. The cooling air diffused through the holes 14 thus enters the combustion chamber 1 in the general gas flow direction D at an angle of inclination $A_4$.

The holes 14 in the first zone 16a are so oriented as to ensure diffusion of cooling air into the chamber 1 in countercurrent to the general gas flow direction D, the axes 30 of these holes 14 forming an inclination angle $A_1$ between −60° and 0°, and being parallel to the axial plane 18a passing through the axis 35 of the dilution hole 12a.

Figure 5:
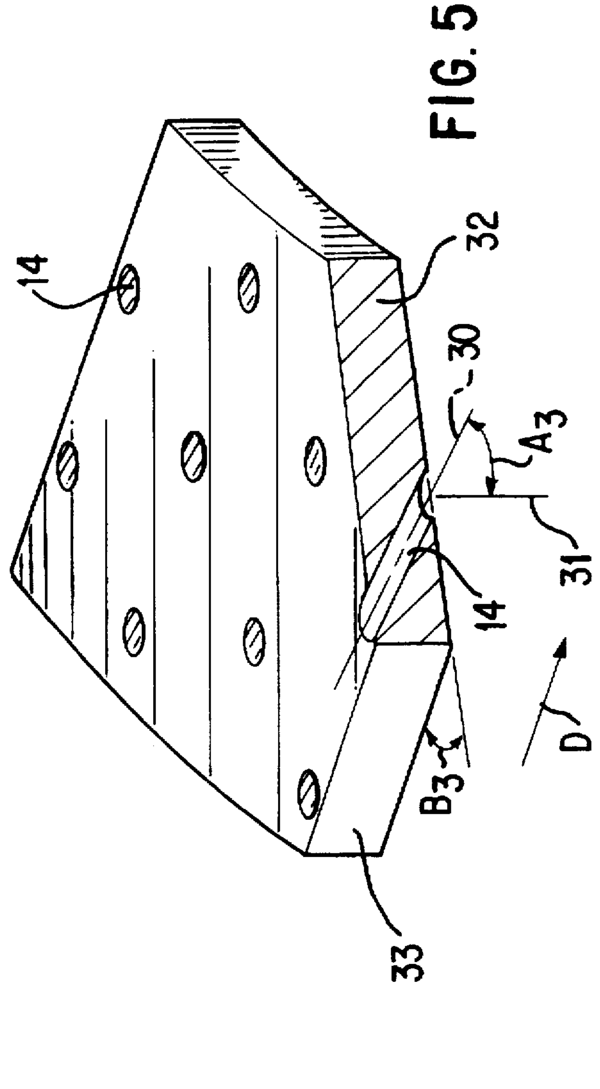
FIG. 5 is a part perspective view of a portion of the wall in which the through holes are inclined in both the axial and circumferential directions.

FIG. 5 shows a small part 36 of the outer wall 2 in the region of a third zone 19b. The cooling holes 14 therein each extend at an inclination angle $A_3$ relatively to the respective normal 31, and in a plane making a clock angle $B_3$ with the main flow direction D. The clock angle $B_3$ is determined in dependence upon the average direction of the gas flow locally in the third zone 19b.

We claim:

1. A combustion chamber for a turbomachine, comprising:

at least one wall having a plurality of dilution holes evenly arranged on a plane transverse to a general direction of a flow of burnt gas in the combustion chamber, and a plurality of through holes around said dilution holes, and a fluid passing through said through holes for cooling said at least one wall;

each of said through holes defined by both a first angle and a second angle, said first angle formed between a center axis of each of said through holes and a normal axis perpendicular to said at least one wall at a center of each of said through holes, said second angle formed between a first plane including both said center axis and said normal axis and a second plane parallel to both said normal axis and said general direction of the flow of the burnt gas;

said at least one wall comprising a plurality of zones within each of which a direction of a local flow of the burnt gas is approximately the same, wherein the direction of the local flow in different of said zones is different; and each first angle of each of said through holes arranged within each of said zones being the same and each second angle of each of said through holes arranged within each of said zones being the same, said first and second angles being determined according to an average direction of the local flow of the burnt gas in each of the zones.

2. A combustion chamber according to claim 1, wherein said at least one wall comprises first zones, second zones, third zones and fourth zones, each of said first zones being disposed downstream of each of said dilution holes, each of said second zones and each of said third zones being disposed contacting with each of said first zones on opposite sides with respect to a line which passes through a center of each of said dilution holes and which is parallel to said general direction of the flow of the burnt gas, and said fourth zones covering said at least one wall except for said first, second and third zones, axes of said through holes within said first zones extending in a substantially opposite direction to said general direction of the flow of the burnt gas.

3. A combustion chamber according to claim 2, wherein said first angle within said fourth zones is greater than 30°.

4. A combustion chamber according to claim 3, wherein said second angle within said fourth zones is equal to 0°.

5. A combustion chamber according to claim 2, wherein said first angle within said first zones is between 0° and 60°.

6. A combustion chamber according to claim 5, wherein said second angle within said first zones is equal to 0°.

7. A combustion chamber according to claim 2, wherein a value of said second angle within said second zones is opposite to that of said second angle within said third zones.

* * * * *

UNITED STATES PATENT AND TRADEMARK OFFICE
CERTIFICATE OF CORRECTION

PATENT NO. : 5,775,108
DATED : July 7, 1998
INVENTOR(S) : Ansart et al

It is certified that error appears in the above-identified patent and that said Letters Patent is hereby corrected as shown below:

Column 1, line 9, change "The" to --the--;

line 27, change "eachother" to --each other--.

Signed and Sealed this

Fifteenth Day of May, 2001

*Attest:*

NICHOLAS P. GODICI

*Attesting Officer* — *Acting Director of the United States Patent and Trademark Office*